United States Patent
Panwar et al.

(10) Patent No.: US 12,229,509 B2
(45) Date of Patent: Feb. 18, 2025

(54) CONTEXTUAL IMPACT ADJUSTMENT FOR MACHINE LEARNING MODELS

(71) Applicant: International Business Machines Corporation, Armonk, NY (US)

(72) Inventors: Naveen Panwar, Bangalore (IN); Nishtha Madaan, Gurgaon (IN); Deepak Vijaykeerthy, Bangalore (IN); Pranay Kumar Lohia, Bhagalpur (IN); Diptikalyan Saha, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 17/233,727

(22) Filed: Apr. 19, 2021

(65) Prior Publication Data

US 2022/0335217 A1 Oct. 20, 2022

(51) Int. Cl.
*G06F 40/279* (2020.01)
*G06F 18/2431* (2023.01)
*G06N 3/045* (2023.01)
*G06N 3/08* (2023.01)

(52) U.S. Cl.
CPC ........ *G06F 40/279* (2020.01); *G06F 18/2431* (2023.01); *G06N 3/045* (2023.01); *G06N 3/08* (2013.01)

(58) Field of Classification Search
CPC ...................................................... G06N 3/08
See application file for complete search history.

(56) References Cited

U.S. PATENT DOCUMENTS

2018/0246873 A1* 8/2018 Latapie ................ G06N 3/08

FOREIGN PATENT DOCUMENTS

| CN | 111079532 B | * | 7/2021 | ......... G06K 9/00711 |
| CN | 108664632 B | * | 9/2021 | ........... G06F 40/284 |

OTHER PUBLICATIONS

Mehta, et al., "WEClustering: word embeddings based text clustering technique for large datasets," Complex & Intelligent Systems, Apr. 2021. (Year: 2021).*
Zhang, et al. "Hurtful Words: Quantifying Biases in Clinical Contextual Word embeddings, " ACM, 2020. (Year: 2020).*
(Continued)

*Primary Examiner* — Feng-Tzer Tzeng
(74) *Attorney, Agent, or Firm* — Ryan, Mason & Lewis, LLP (57) ABSTRACT

Methods, systems, and computer program products for detecting contextual bias in text are provided herein. A computer-implemented method includes identifying, by a machine learning network, a protected attribute in one or more data samples; processing the identified data samples using a first sub-network of the machine learning network, wherein the first sub-network is configured to determine a plurality of contexts of the protected attribute across the identified data samples; determining an impact of each of the plurality of contexts on a second sub-network of the machine learning network, wherein the second sub-network of the machine learning network is configured to classify a given data sample into one of a plurality of classes; and adjusting the second sub-network of the machine learning to account for the impact of at least one of the plurality of contexts on the second sub-network.

20 Claims, 6 Drawing Sheets

(56) References Cited

OTHER PUBLICATIONS

Mehta, et al., "WEClustering: word embeddings based text clustering technique for large datasets, " Complex & Intelligent Systems, Apr. 2021. (see previous Office action attachment) (Year: 2021).*

Mehta, et al., "WEClustering: word embeddings based text clustering technique for large datasets," Complex & Intelligent Systems, Apr. 2021—see attached reference in the first Office action. (Year: 2021).*

Vaswani, Ashish, et al. "Attention is all you need." arXiv preprint arXiv:1706.03762 (2017).

Sun, Tony, et al. "Mitigating gender bias in natural language processing: Literature review." arXiv preprint arXiv:1906.08976 (2019).

Bolukbasi, Tolga, et al. "Man is to computer programmer as woman is to homemaker? Debiasing word embeddings." arXiv preprint arXiv:1607.06520 (2016).

Zhao, Jieyu, et al. "Men also like shopping: Reducing gender bias amplification using corpus-level constraints." arXiv preprint arXiv:1707.09457 (2017).

Tan, Yi Chern, and L. Elisa Celis. "Assessing social and intersectional biases in contextualized word representations." arXiv preprint arXiv:1911.01485 (2019).

Kuang, Sicong, and Brian D. Davison. "Semantic and context-aware linguistic model for bias detection." Proc. of the Natural Language Processing meets Journalism IJCAI-16 Workshop. 2016.

Zhang, Haoran, et al. "Hurtful words: quantifying biases in clinical contextual word embeddings." proceedings of the ACM Conference on Health, Inference, and Learning. 2020.

Recasens, Marta, Cristian Danescu-Niculescu-Mizil, and Dan Jurafsky. "Linguistic models for analyzing and detecting biased language." Proceedings of the 51st Annual Meeting of the Association for Computational Linguistics (vol. 1: Long Papers). 2013.

Díaz, Mark, et al. "Addressing age-related bias in sentiment analysis." Proceedings of the 2018 chi conference on human factors in computing systems. 2018.

Mell, Peter, et al., The NIST Definition of Cloud Computing, National Institute of Standards and Technology, U.S. Department of Commerce, NIST Special Publication 800-145, Sep. 2011.

* cited by examiner

CONTEXTUAL IMPACT ADJUSTMENT FOR MACHINE LEARNING MODELS

BACKGROUND

The present application generally relates to information technology and, more particularly, to bias in artificial intelligence (AI) models.

AI models may be trained to find associations between entities and attributes for a given task. Such models are susceptible to bias when trained on a large text corpus.

SUMMARY

In one embodiment of the present disclosure, techniques for detecting contextual bias in text are provided. An exemplary computer-implemented method includes the steps of identifying, by a machine learning network, a protected attribute in one or more data samples; processing the identified data samples using a first sub-network of the machine learning network, wherein the first sub-network is configured to determine a plurality of contexts of the protected attribute across the identified data samples; determining an impact of each of the plurality of contexts on a second sub-network of the machine learning network, wherein the second sub-network of the machine learning network is configured to classify a given data sample into one of a plurality of classes; and adjusting the second sub-network of the machine learning to account for the impact of at least one of the plurality of contexts on the second sub-network.

Another embodiment of the present disclosure or elements thereof can be implemented in the form of a computer program product tangibly embodying computer readable instructions which, when implemented, cause a computer to carry out a plurality of method steps, as described herein. Furthermore, another embodiment of the present disclosure or elements thereof can be implemented in the form of a system including a memory and at least one processor that is coupled to the memory and configured to perform noted method steps. Yet further, another embodiment of the present disclosure or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present disclosure will become apparent from the following detailed description of illustrative embodiments thereof, which is to be read in connection with the accompanying drawings.

DETAILED DESCRIPTION

Generally, an AI model trained on a large corpus of text is susceptible to contextual and/or associative bias. Existing techniques include counterfactual fairness processes, which apply multiple perturbations of a protected attribute to predict an unbiased result. A protected attribute generally refers to a particular attribute that is to be de-biased (e.g., attributes related to gender, age, nationality, etc.). Such techniques typically generate perturbations of text without regard for the context of the text. By way of example, when removing gender-related bias of a model, existing techniques may include generating perturbations of the word "Miss". However, the perturbations are generated for all contexts of the word "miss," including contexts where the word miss is unrelated to gender, such as when "miss" is defined as failing to hit, reach, or come into contact with something aimed at, for example.

As described herein, embodiments of the present disclosure include techniques for detecting attribute/entity relation specific contextual bias in text. An example embodiment includes finding contextual information related to protected attributes/entities and finding bias toward these attributes/entities based on the contextual information. Additionally, one or more example embodiments explain bias towards a protected attribute in text using a contextual definition.

Figure 1:
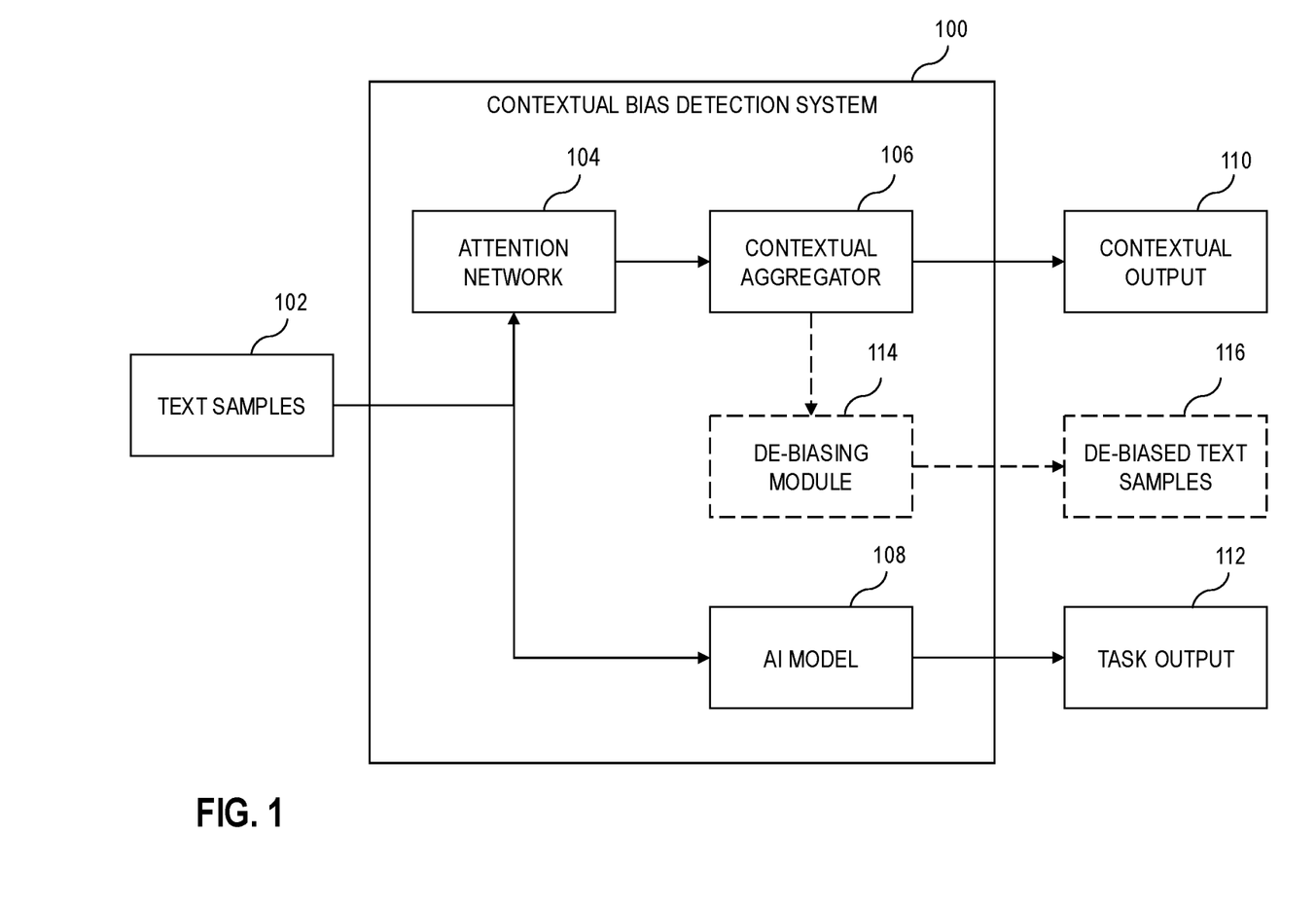
FIG. 1 is a diagram illustrating a contextual bias detection system in accordance with exemplary embodiments.

FIG. 1 is a diagram illustrating a contextual bias detection system 100 in accordance with exemplary embodiments. The contextual bias detection system 100 depicted in FIG. 1 is configured to learn contextual bias of text samples 102 while training an AI model 108. More particularly, the contextual bias detection system 100 implements a dual parallel AI network with two sub-networks. The first sub-network is configured to train the AI model 108 to perform a task (e.g., a classification task) using one or more of the text samples 102. The second sub-network of the contextual bias detection system 100 includes an attention network 104 which determines contextual information for each of the text samples 102 that includes a protected attribute. In one example embodiment, the contextual bias detection system 100 also includes a contextual aggregator 106 configured to aggregate the contextual information determined by the attention network 104 for each of the text samples 102, for example. In some example embodiments, the contextual aggregator 106 may determine different contexts in which the protected attribute is used in the text samples 102 based on the aggregated contextual information and rank the contexts according to the relative amount of bias attributed to each of the contexts. In some examples, the contextual bias detection system 100 provides contextual output 110 that explains the contextual bias of the samples of the input text 102 along with the output of the AI model 108 for such samples.

By way of example, the AI model 108 may be trained to learn the sentiment (for example, negative, neutral, or positive) of a given text sample from text input 102, and the attention network 104 may learn the context of how a protected attribute is used in that text sample. By way of example, assume the protected attribute is gender, and a given text sample in the text input 102 includes the word "miss," then the attention network 104 can identify how that word is used in the text sample (e.g., if it is used to refer to gender or if it is used to refer to the verb meaning failing to hit, reach, or come into contact with something aimed at). As such, the contextual bias detection system 100 can identify and explain contexts of the word "miss" across all the samples of the input text 102.

Additionally, in one or more example embodiments, the contextual bias detection system 100 includes a de-biasing module 114 that uses the aggregated contextual information from contextual aggregator 106 to automatically identify one or more contexts for which to de-bias the text samples 102 (e.g., only de-bias text samples where the context of the word "miss" is gender-related). For example, the de-biasing module 114 may generate and output a set of de-biased text samples 116 by augmenting or modifying the text samples 102. The de-biased text samples can then be used to re-train the AI model 108 to remove the specified contextual bias.

In at least some example embodiments, the attention network 104 is used as a residual connection in the dual parallel AI network of the contextual bias detection system 100 to enable an in-processing framework for finding both bias in a given entity as well as the contextual information of the entity. It is noted that the term "text sample" is used herein to refer to a sequence of words, and each "entity" corresponds to a word in a text sample. By way of example, the attention network 104 may be implemented as a multi-head attention encoders network that captures the contextual information for protected attributes and entity relations. In such an example, the multi head attention encoders may capture the association among protected attributes and entities. For example, the attention network 104 may learn the attention over an input text sample for a given prediction from the AI model 108. Computing the attention over the input text sample allows the residual network to be trained more easily. For example, the AI model 108 can learn faster as the attention network 104 captures which words contribute most to the output of AI model 108.

Figure 2:
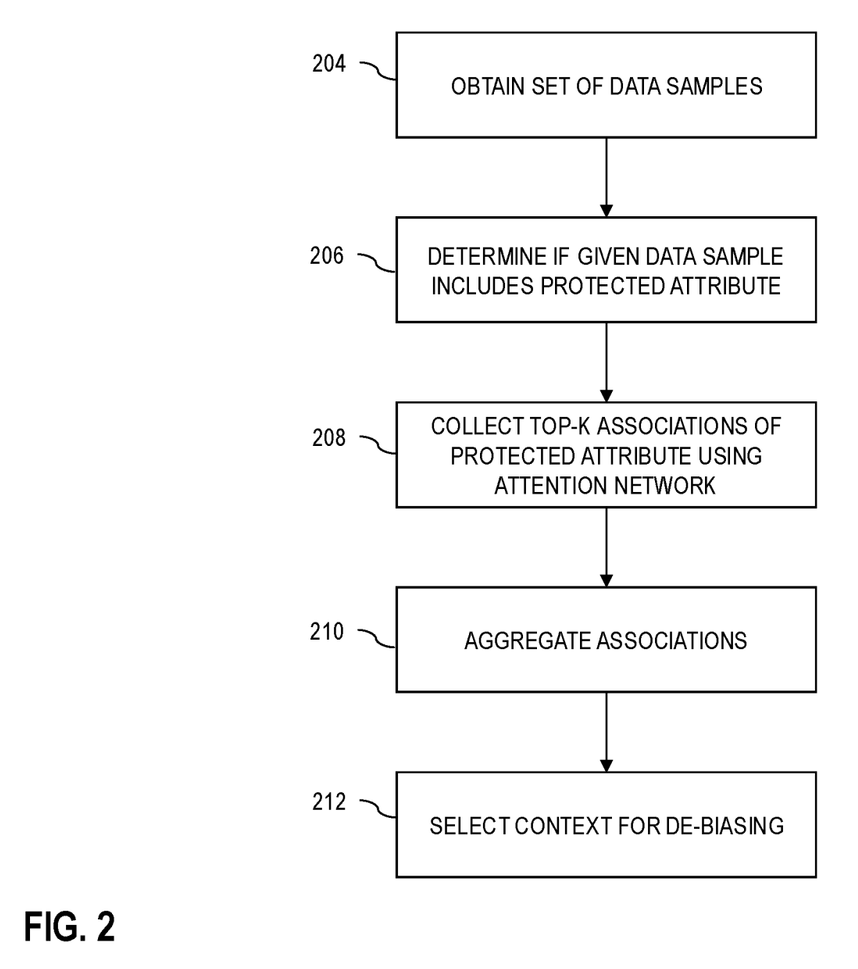
FIG. 2 is a flow diagram of a contextualization process in accordance with exemplary embodiments.

Referring now to FIG. 2, this figure shows a flow diagram of a contextualization process in accordance with exemplary embodiments. In some example embodiments, the process depicted in FIG. 2 may be performed, at least in part by, the attention network 104 and the contextual aggregator 106 of FIG. 1, for example.

Step 204 includes obtaining a set of data samples. Step 206 includes determining whether a given data sample in the set includes a protected attribute. If no, then the next data sample in the set is checked at step 206. If yes, then the process continues to step 208, which includes collecting the top-k associations of the protected attribute using the attention network. Step 210 includes aggregating the associations, which can be performed based on, for example, weightage of the attention and/or frequencies. After each data sample in the set is checked, the process continues to step 212, which includes selecting a particular context of the protected attribute that is to be de-biased based on the aggregated associations.

In some example embodiments, the attention network 104 provides protected attributes and their respective contribution towards the output of the AI model 108 as a real number between 0 and 1, where 0 represents no contribution and 1 represents the highest contribution. By way of example, assume a given input text sample has two protected attributes, P1 and P2, and the output of the attention network 104 is: P1—0.9; P2—0.9; P1—0.8. One or more example embodiments may use the frequencies of the protected attribute to aggregate the associations. In the example above, the frequency of P1 is two (as it occurs twice in the input text sample) and the frequency of P2 is one (as it occurs once in the input text sample). Alternatively, or additionally, the weightage of the protected attributes may be used to aggregate the associations. In the example above, the weightage of P1 is equal to 0.85 (i.e., (0.9+0.8)/2), and the weightage of P2 is equal to 0.9.

Figure 3:
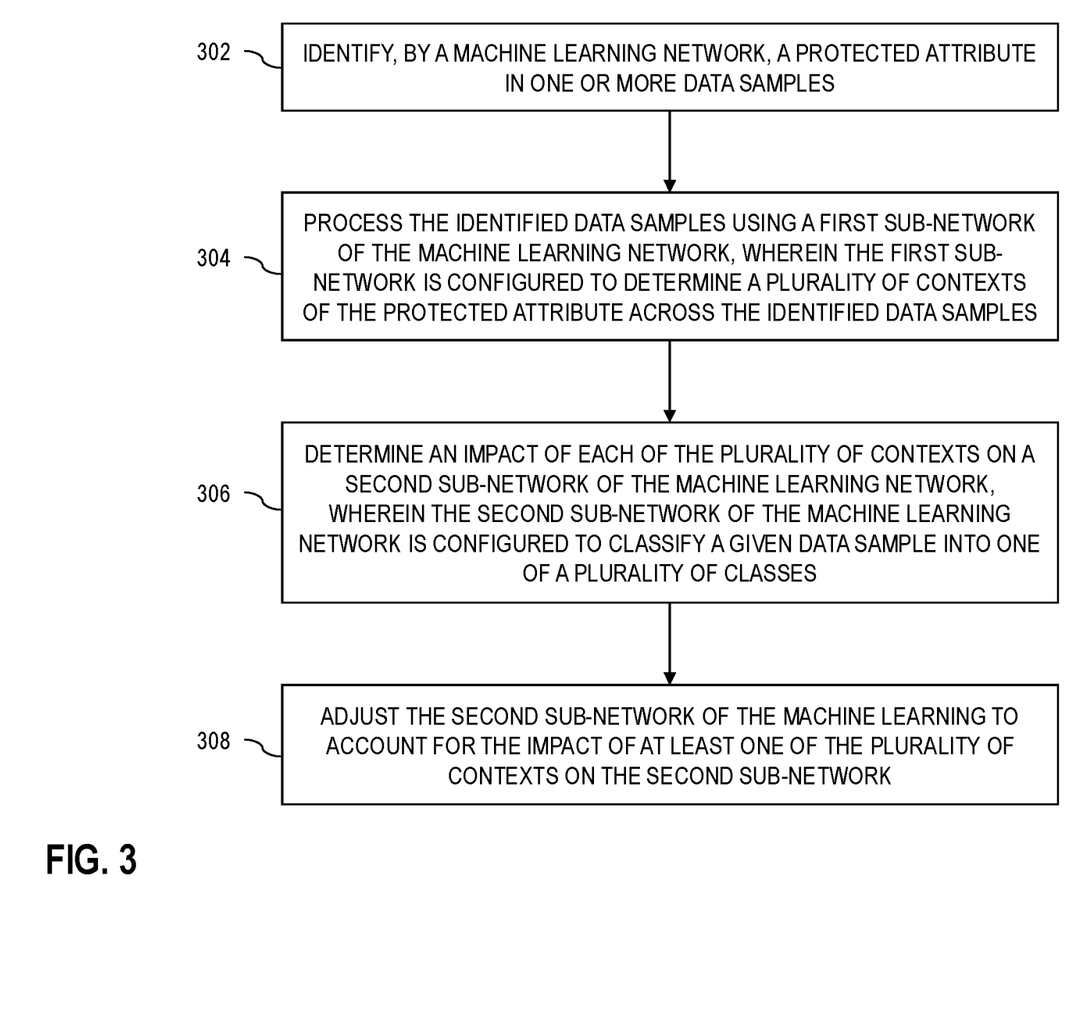
FIG. 3 is a flow diagram illustrating techniques in accordance with exemplary embodiments.

FIG. 3 is a flow diagram illustrating techniques in accordance with exemplary embodiments. Step 302 includes identifying, by a machine learning network, a protected attribute in one or more data samples. Step 304 includes processing the identified data samples using a first sub-network of the machine learning network, wherein the first sub-network is configured to determine indicating a plurality of contexts of the protected attribute across the identified data samples. Step 306 includes determining an impact of each of the plurality of contexts on a second sub-network of the machine learning network, wherein the second sub-network of the machine learning network is configured to classify a given data sample into one of a plurality of classes. Step 308 includes adjusting the second sub-network of the machine learning to account for the impact of at least one of the plurality of contexts on the second sub-network.

The first sub-network may be implemented as a residual connection in the machine learning network. The first sub-network may include a multi-head attention residual network. The second sub-network may include a feature learning neural network. The techniques depicted in FIG. 3 may include generating and outputting an explanation of the impact of the at least one of the plurality of contexts. Each of the data samples may include a sequence of text, and the protected attribute may correspond to a portion of the sequence of text. The contextual information may include at least one of: types of associations between the portion of the data samples corresponding to the protected attribute and other portions of the data samples; and weights assigned by the first sub-network to the respective identified samples. The processing may include aggregating the contextual information for the identified data samples based on at least one of: frequencies of the types of associations and the assigned weights. The machine learning network is trained on a first set of training data, and wherein the adjusting may include: retraining the machine learning network using a second set of training data to reduce the impact of at least one of the plurality of contexts on the second sub-network relative to the first set of training data.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the present disclosure, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the present disclosure, the computer program product can include computer useable program code that is stored in a computer readable storage medium in a server data processing system, and wherein the computer useable program code is downloaded over a network to a remote data processing system for use in a computer readable storage medium with the remote system.

An exemplary embodiment or elements thereof can be implemented in the form of an apparatus including a memory and at least one processor that is coupled to the memory and configured to perform exemplary method steps.

Figure 4:
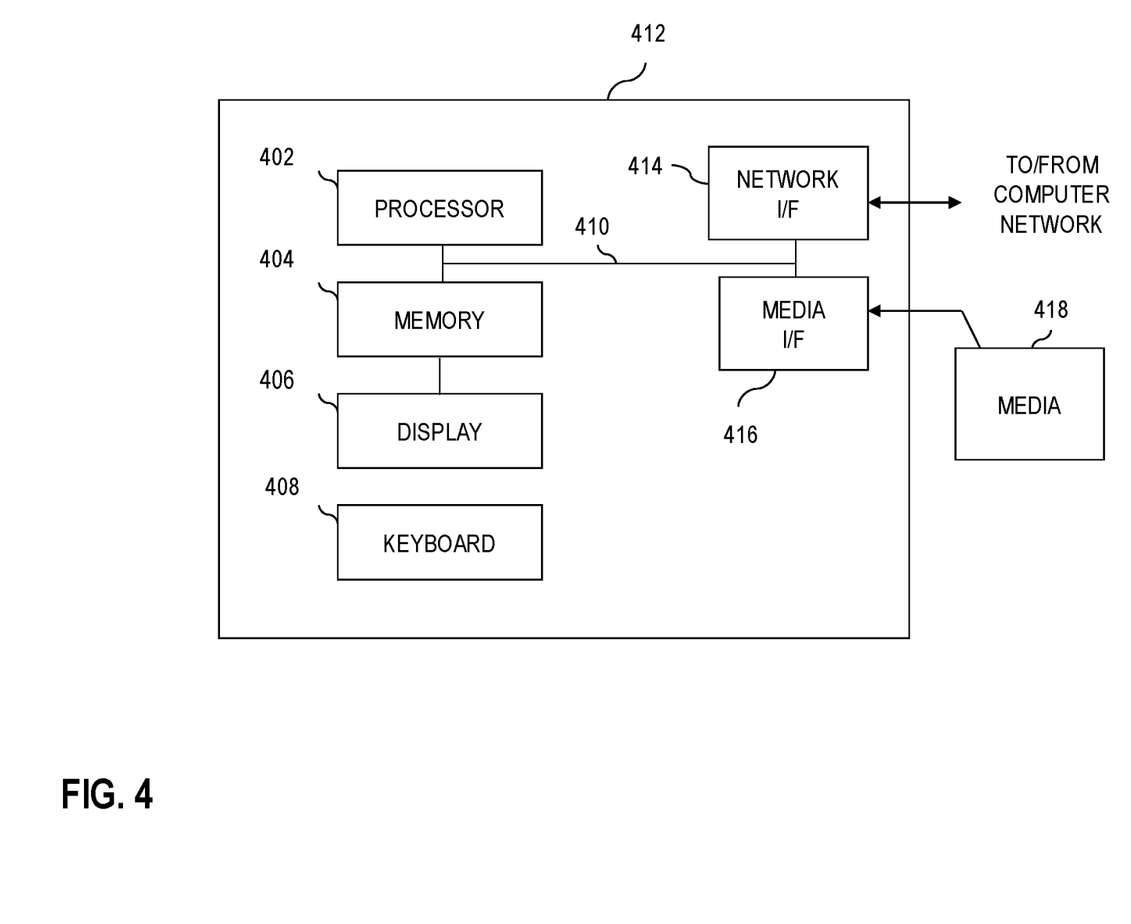
FIG. 4 is a system diagram of an exemplary computer system on which at least one embodiment of the present disclosure can be implemented.

Additionally, an embodiment of the present disclosure can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the present disclosure, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

An exemplary embodiment may include a system, a method, and/or a computer program product at any possible technical detail level of integration. The computer program product may include a computer readable storage medium (or media) having computer readable program instructions thereon for causing a processor to carry out exemplary embodiments of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present disclosure.

Embodiments of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings provided herein, one of ordinary skill in the related art will be able to contemplate other implementations of the components.

Additionally, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
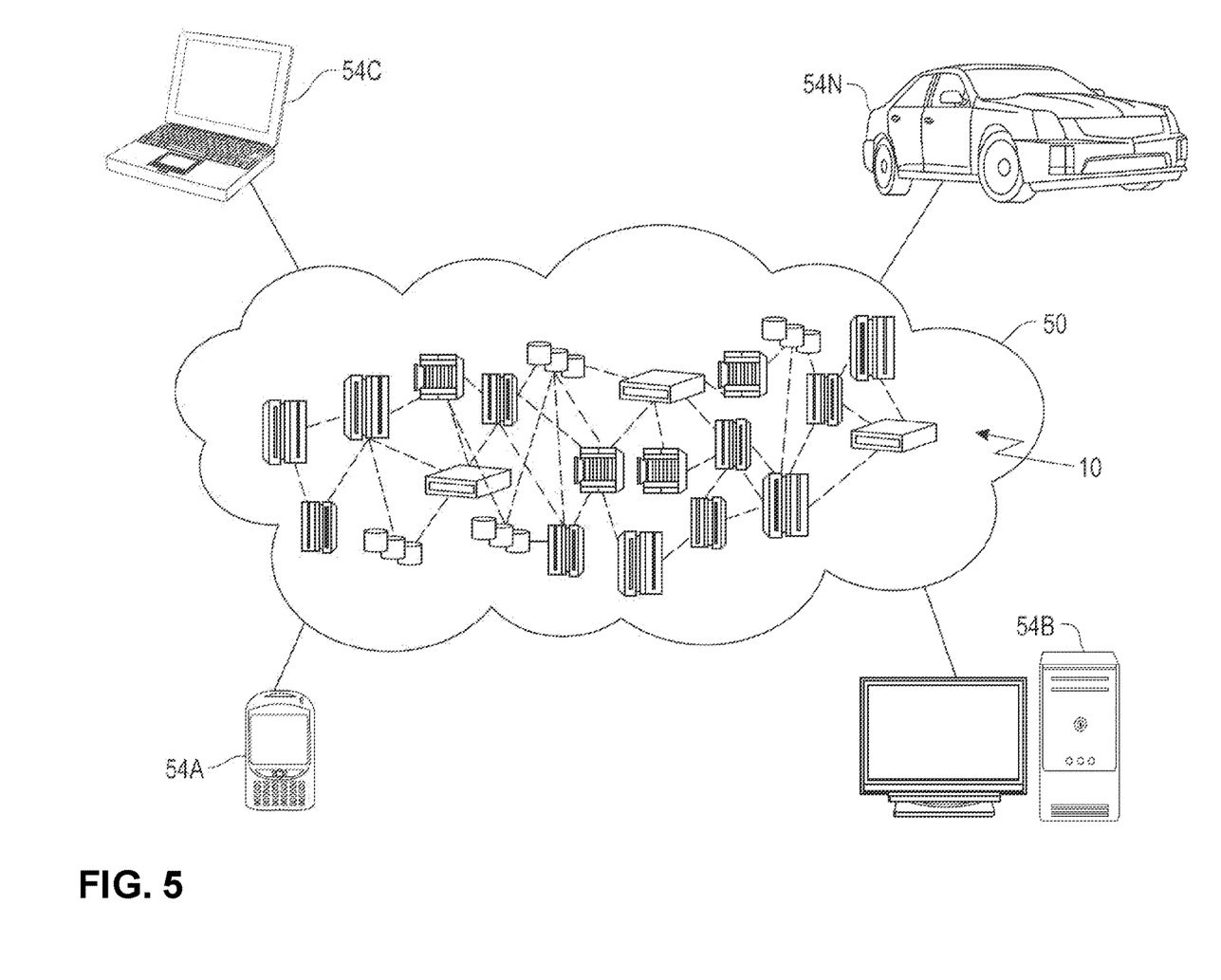
FIG. 5 depicts a cloud computing environment in accordance with exemplary embodiments.
Figure 6:
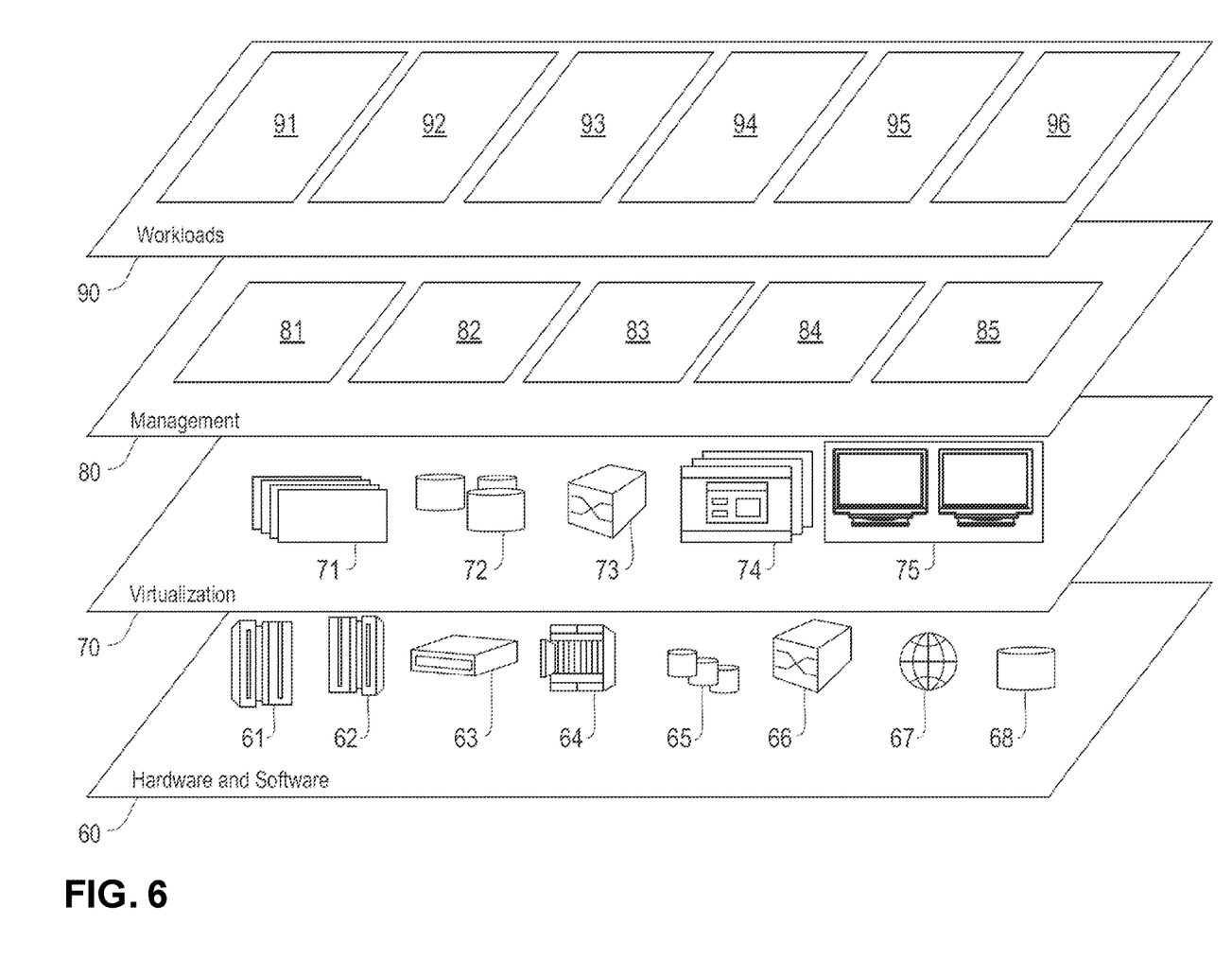
FIG. 6 depicts abstraction model layers in accordance with exemplary embodiments.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and detecting contextual bias in text 96, in accordance with the one or more embodiments of the present disclosure.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present disclosure may provide a beneficial effect such as, for example, detecting and mitigating contextual bias in AI models.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:
   identifying, by a machine learning network, a plurality of data samples comprising a protected attribute;
   processing the identified data samples using a first sub-network of the machine learning network, wherein the first sub-network is configured to determine information corresponding to a plurality of contexts of the protected attribute across the identified data samples, wherein each of the plurality of contexts corresponds to a different meaning associated with the protected attribute;
   determining respective impacts of the plurality of contexts on a second sub-network of the machine learning network, wherein the second sub-network of the machine learning network is configured to classify a given data sample into one of a plurality of classes; and
   adjusting the second sub-network of the machine learning network to account for the impact corresponding to at least one of the plurality of contexts on the second sub-network;
   wherein the method is carried out by at least one computing device.

2. The computer-implemented method of claim 1, wherein the first sub-network is implemented as a residual connection in the machine learning network.

3. The computer-implemented method of claim 2, wherein the first sub-network comprises a multi-head attention residual network.

4. The computer-implemented method of claim 1, wherein the second sub-network comprises a feature learning neural network.

5. The computer-implemented method of claim 1, comprising:
   generating and outputting an explanation of the impact corresponding to the at least one of the plurality of contexts on the second sub-network.

6. The computer-implemented method of claim 1, wherein each of the data samples comprises a sequence of text, and wherein the protected attribute corresponds to a portion of the sequence of text.

7. The computer-implemented method of claim 1, wherein at least one of:
   the relevance of different portions of the given one of the identified data samples to the portion of the given identified data sample is based on an attention computed for the given one of the identified data samples; and
   the information comprises weights assigned by the first sub-network to the respective identified samples.

8. The computer-implemented method of claim 7, wherein said processing comprises:
   aggregating the information for the identified data samples based on at least one of: frequencies of types of associations and the assigned weights.

9. The computer-implemented method of claim 1, wherein the machine learning network is trained on a first set of training data, and wherein said adjusting comprises:
   retraining the machine learning network using a second set of training data that reduces the impact of at least one of the plurality of contexts on the second sub-network relative to the first set of training data.

10. The computer-implemented method of claim 1, wherein software is provided as a service in a cloud environment.

11. A computer program product comprising a computer readable storage medium having program instructions embodied therewith, the program instructions executable by a computing device to cause the computing device to:
    identify, by a machine learning network, a plurality of data samples comprising a protected attribute;
    process the identified data samples using a first sub-network of the machine learning network, wherein the first sub-network is configured to determine information corresponding to a plurality of contexts of the protected attribute across the identified data samples, wherein each of the plurality of contexts corresponds to a different meaning associated with the protected attribute;
    determine respective impacts of the plurality of contexts on a second sub-network of the machine learning network, wherein the second sub-network of the machine learning network is configured to classify a given data sample into one of a plurality of classes; and
    adjust the second sub-network of the machine learning network to account for the impact corresponding to at least one of the plurality of contexts on the second sub-network.

12. The computer program product of claim 11, wherein the first sub-network is implemented as a residual connection in the machine learning network.

13. The computer program product of claim 12, wherein the first sub-network comprises a multi-head attention residual network.

14. The computer program product of claim 11, wherein the second sub-network comprises a feature learning neural network.

15. The computer program product of claim 11, wherein the program instructions executable by the computing device cause the computing device to:
    generate and output an explanation corresponding to the impact of the at least one of the plurality of contexts on the second sub-network.

16. The computer program product of claim 11, wherein each of the data samples comprises a sequence of text, and wherein the protected attribute corresponds to a portion of the sequence of text.

17. The computer program product of claim 11, wherein at least one of:

the relevance of different portions of the given one of the identified data samples to the portion of the given identified data sample is based on an attention computed for the given one of the identified data samples; and the information comprises weights assigned by the first sub-network to the respective identified samples.

18. The computer program product of claim 17, wherein said processing comprises:

aggregating the information for the identified data samples based on at least one of: frequencies of types of associations and the assigned weights.

19. The computer program product of claim 11, wherein the machine learning network is trained on a first set of training data, and wherein said adjusting comprises:

retraining the machine learning network using a second set of training data that reduces the impact of at least one of the plurality of contexts on the second sub-network relative to the first set of training data.

20. A system comprising:

a memory configured to store program instructions;

a processor operatively coupled to the memory to execute the program instructions to:

identify, by a machine learning network, a plurality of data samples comprising a protected attribute;

process the identified data samples using a first sub-network of the machine learning network, wherein the first sub-network is configured to determine information corresponding to a plurality of contexts of the protected attribute across the identified data samples, wherein each of the plurality of contexts corresponds to a different meaning associated with the protected attribute;

determine respective impacts of the plurality of contexts on a second sub-network of the machine learning network, wherein the second sub-network of the machine learning network is configured to classify a given data sample into one of a plurality of classes; and adjust the second sub-network of the machine learning network to account for the impact corresponding to at least one of the plurality of contexts on the second sub-network.

* * * * *